United States Patent [19]
Townsend

[11] 3,964,129
[45] June 22, 1976

[54] APPARATUS FOR LOOPING AND CONVEYING AN ENCASED PRODUCT

[75] Inventor: Ray T. Townsend, Des Moines, Iowa
[73] Assignee: Townsend Engineering Company, Des Moines, Iowa
[22] Filed: Mar. 27, 1974
[21] Appl. No.: 455,252

[52] U.S. Cl. .................................. 17/33; 17/34
[51] Int. Cl.² ................................... A22C 11/00
[58] Field of Search ............... 17/33, 34; 53/177

[56] References Cited
UNITED STATES PATENTS

| | | | |
|---|---|---|---|
| 1,153,584 | 9/1915 | Swoboda | 17/34 |
| 1,292,645 | 1/1919 | Reisfeld | 17/33 |
| 1,442,232 | 1/1923 | Neuberth | 17/34 |
| 3,191,222 | 6/1965 | Townsend | 17/33 |
| 3,457,588 | 7/1969 | Myles et al. | 17/33 |
| 3,694,853 | 10/1972 | Greider | 17/33 |

*Primary Examiner*—Louis G. Mancene
*Assistant Examiner*—James D. Hamilton
*Attorney, Agent, or Firm*—Zarley, McKee, Thomte & Voorhees

[57] ABSTRACT

An apparatus for looping and conveying an encased product comprising a support positioned adjacent one end of the encasing apparatus and having a guide pan pivotally movably mounted thereon adapted to move between first and second positions. The guide pan is adapted to slidably receive the casing issuing from the encasing apparatus. A conveyor comprising a plurality of spaced apart hooks is provided adjacent the guide pan and comprises carrying device for moving the hooks along a predetermined path. The conveyor is positioned so that the hooks will pass adjacent the lower end of the guide pan so that the hooks will catch and carry away the casing at spaced apart points along the length of the casing as the casing passes out of the lower end of the guide pan. A power mechanism is provided for pivotally moving the pan between its first and second positions to cause the hooks to catch the casing at the spaced points along the length of the casing. A control mechanism operatively interconnects the conveyor and the power mechanism to coordinate the movement of the guide pan and the hooks. The control mechanism comprises a cam wheel secured to one end of the conveyor drive shaft and in engagement with a switch which is connected to the power mechanism. A modified apparatus is also disclosed wherein the guide pan loops the casing over a conveyor comprising an endless chain having a plurality of spaced apart upstanding plates provided thereon.

3 Claims, 15 Drawing Figures

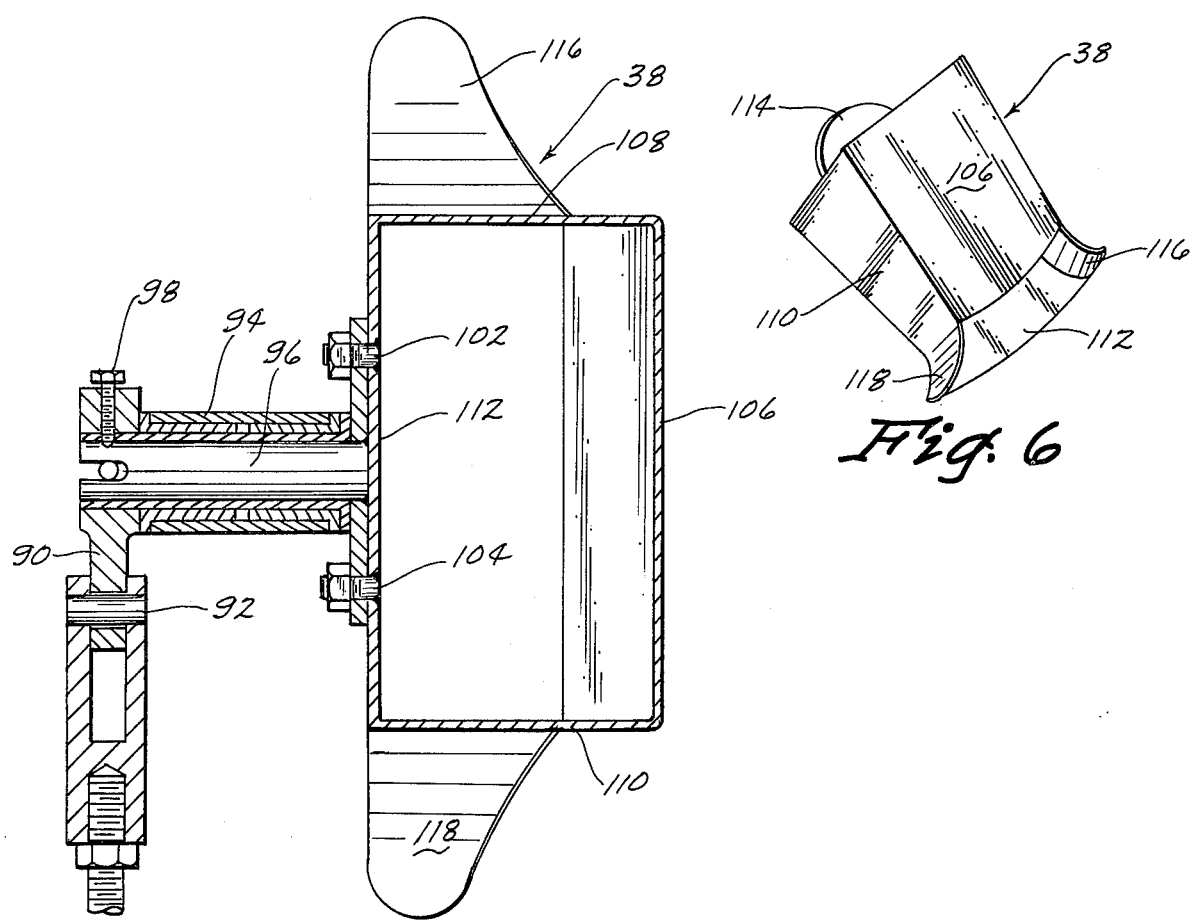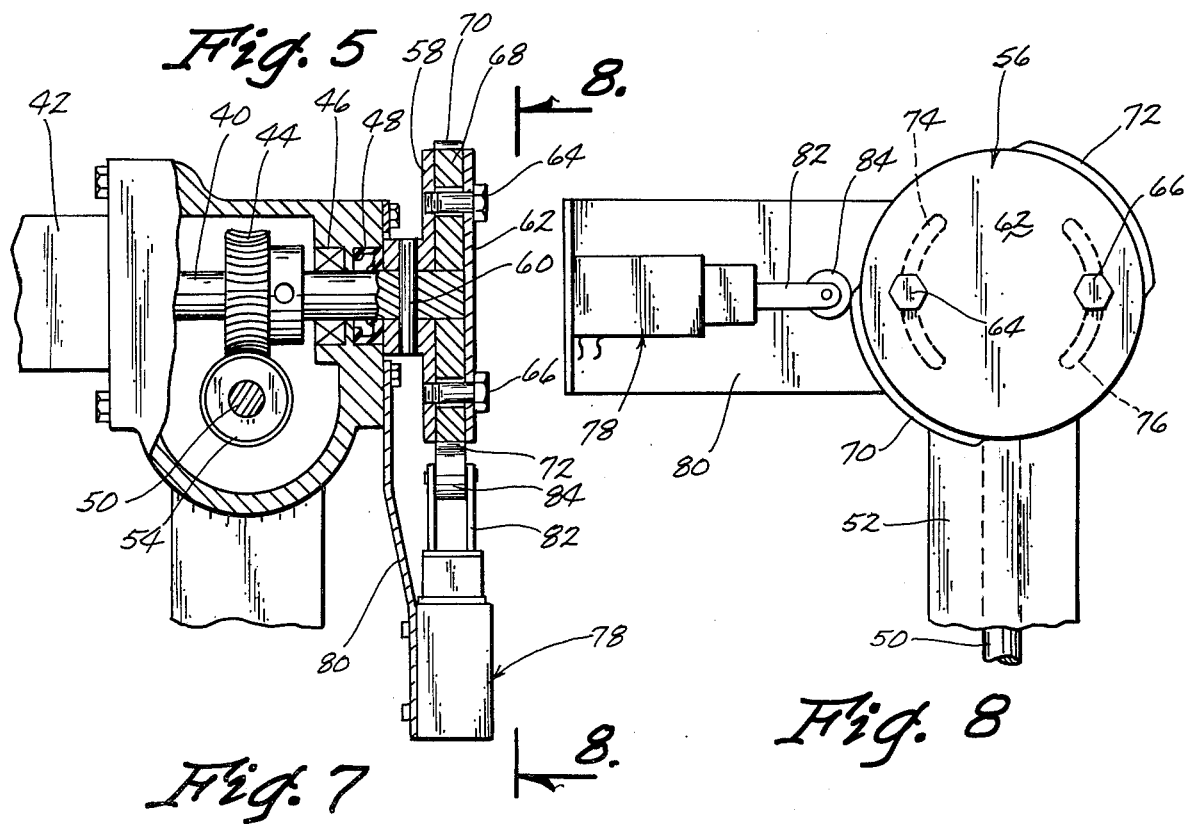

APPARATUS FOR LOOPING AND CONVEYING AN ENCASED PRODUCT

BACKGROUND OF THE INVENTION

This invention relates to a looping and conveying apparatus for use with an encasing machine such as disclosed in U.S. Pat. No. 3,694,853. In said patent, an apparatus was disclosed which produced an elongated linked casing. The casing was passed through a swinging apparatus to aid in positioning the linked casing on a conveyor apparatus having a plurality of hooks extending therefrom. The looping and conveying apparatus disclosed in said patent did provide new and useful results and the instant looping and conveying apparatus disclosed herein represents a distinct improvement over the looping and conveying apparatus disclosed in said patent.

Therefore, it is a principal object of the invention to provide an improved looping and conveying apparatus.

A further object of the invention is to provide a looping and conveying apparatus wherein the looping and conveying apparatus is coordinated.

A further object of the invention is to provide a looping and conveying apparatus comprising a guide pan means which is pivotally movable between first and second positions to guide the casing onto the conveyor apparatus.

A further object of the invention is to provide a looping and conveying apparatus which has adjustment means thereon to achieve the desired looping action.

A further object of the invention is to provide a looping and conveying apparatus which does not damage the encased product.

A still further object of the invention is to provide a looping and conveying apparatus including a conveyor apparatus comprising an endless chain having a plurality of upstanding plate members which receive the casing thereon.

A still further object of the invention is to provide a looping and conveying apparatus which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 5 is an enlarged sectional view seen along lines 5—5 of FIG. 4;

FIG. 6 is a perspective view of the guide pan means;

FIG. 7 is an enlarged sectional view seen along lines 7—7 of FIG. 2;

FIG. 8 is a view seen along lines 8—8 of FIG. 7;

DESCRIPTION OF THE PREFERRED EMBODIMENT

Figure 1:
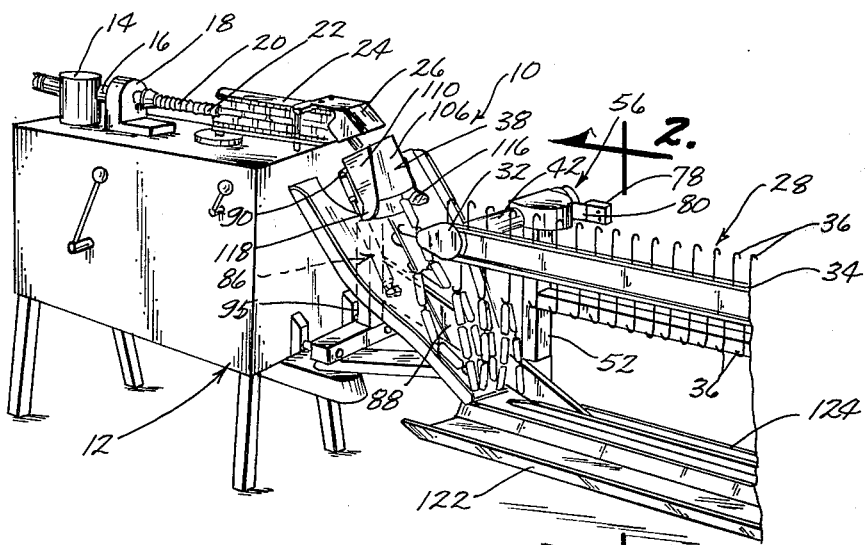
FIG. 1 is a perspective view of the apparatus of this invention being used in combination with an apparatus for encasing a meat product.
Figure 2:
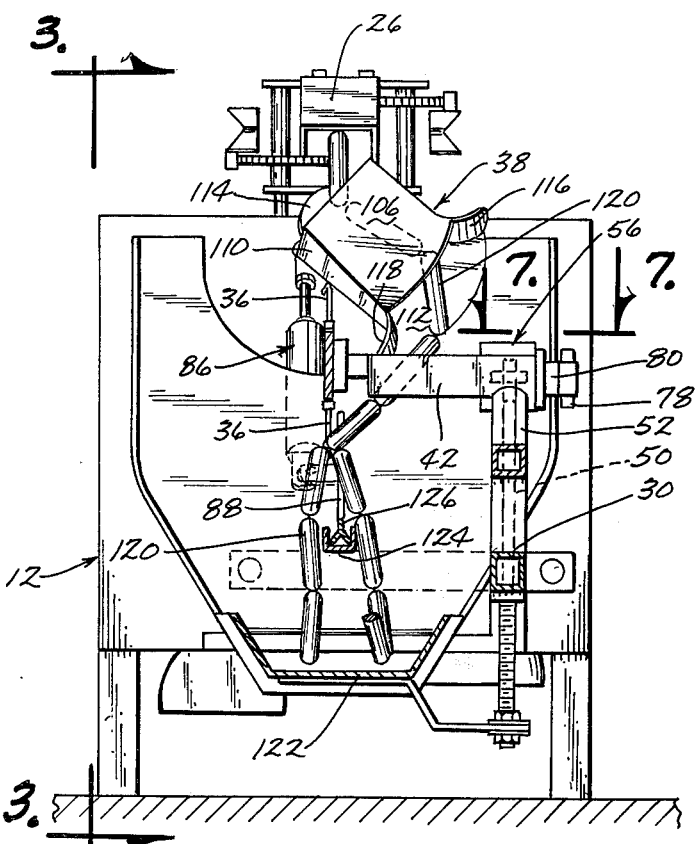
FIG. 2 is a side view of the apparatus with portions thereof cut-away to more fully illustrate the invention.
Figure 3:
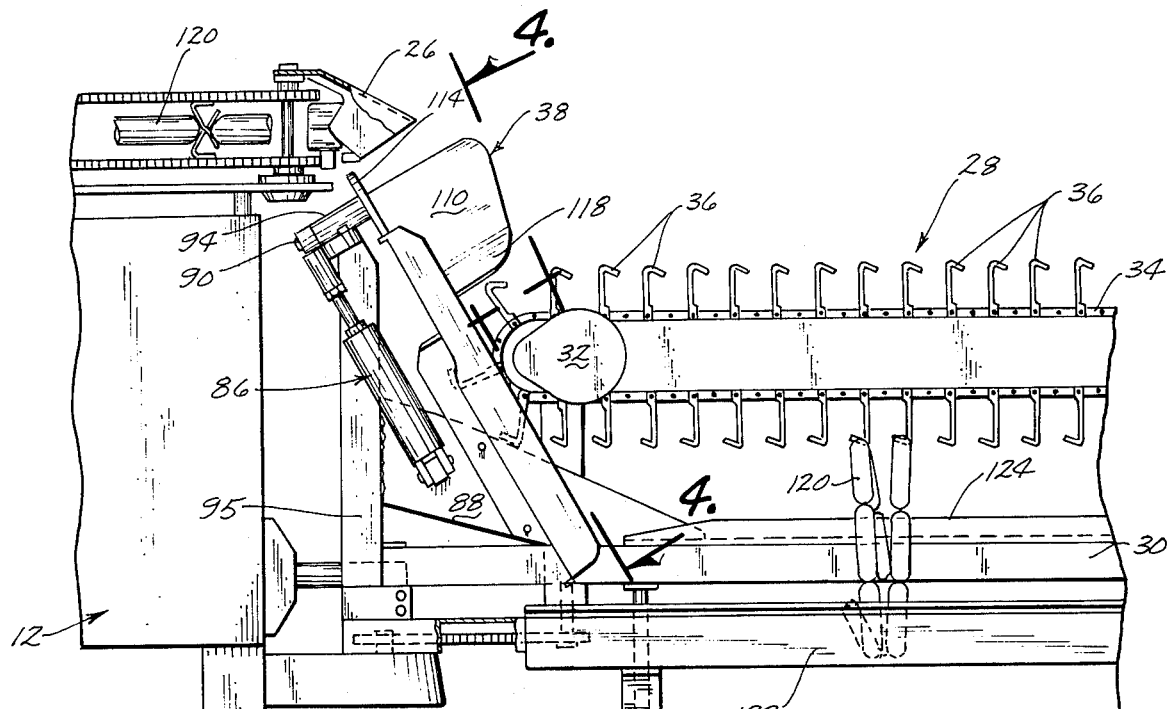
Figure 4:
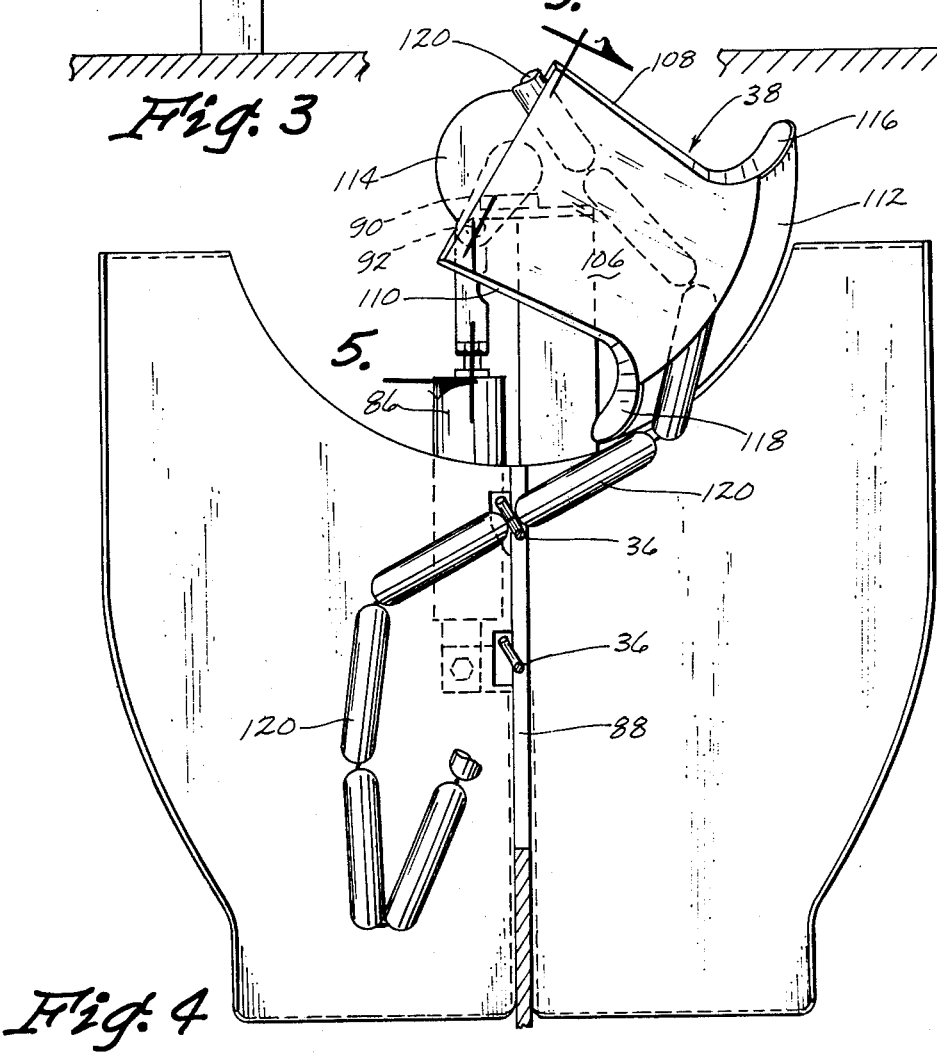
FIG. 4 is an enlarged sectional view seen along lines 4—4 of FIG. 3.

Referring to FIGS. 1–8, the numeral 10 generally designates an apparatus for encasing a product so as to produce sausages, franks and the like. Apparatus 10 is fully disclosed in U.S. Pat. No. 3,694,853 and generally includes a casing filling machine 12 having a conventional drive system enclosed therein. Casing filling machine 12 includes a product pump 14 adapted to pump products of plastic consistency. A connecting conduit 16 connects pump 14 to a spindle housing 18 having an elongated stuffing tube 20 extending therefrom. The meat product is pumped into the casing 22 mounted on the stuffing tube 20 and passed through the linking apparatus generally designated by the reference numeral 24. The linked product is delivered to a guide means 26 adapted to guide the linked product downwardly from the linking apparatus.

The apparatus 28 refers generally to a conveying device including a conveyor frame 30 which supports a pair of spaced apart sprockets 32 at its upper end. Trained around conveyor sprockets 32 is a conveyor chain 34 having a plurality of J-shaped hooks 36 mounted thereon in a spaced relation to one another. Conveyor chain 34 is adapted to be moved around sprockets 32 and is positioned so that the hooks 36 pass adjacent the lower end of a guide pan means 38.

Sprocket 32 has a shaft 40 secured thereto which extends outwardly therefrom within a housing 42. Shaft 40 has a worm gear 44 mounted thereon as seen in FIG. 7 and has its outer end positioned outwardly of the housing 42 as also illustrated in FIG. 7. Suitable bearing means 46 and seal means 48 are provided adjacent the outer end of the shaft 40. A vertically disposed shaft 50 is mounted in housing 52 and has a worm gear 54 mounted on its upper end which is in mesh with worm gear 44. Shaft 50 is operatively connected to a suitable power means so that rotation of shaft 50 will cause the conveyor chain 34 to be moved around the sprockets 32.

The numeral 36 refers generally to a cam wheel which is secured to the outer end of shaft 40. Cam wheel 56 comprises a hub 58 secured to shaft 40 by pin 60. Plate 62 is secured to hub 58 by a pair of bolts 64 and 66 extending therethrough as illustrated in FIG. 7. Cam 68 is positioned between the hub 58 and the plate 62 and has a pair of spaced apart lobes 70 and 72 protruding from the periphery of the plate 62 as seen in FIG. 8. Cam 68 has a pair of arcuate slots 74 and 76 formed therein which are adapted to receive the bolts 64 and 66 extending therethrough respectively to permit the position of the lobes 70 and 72 to be selectively varied with respect to the hub 58 and plate 62.

The numeral 78 refers to a switch which is secured to support 80 secured to the housing 42 as seen in FIG. 7.

Switch 80 is provided with a switch arm 82 extending therefrom having a roller 84 rotatably secured to the outer end thereof which is adapted to be engaged by the lobes 70 and 72 as the cam wheel 56 is rotated.

Switch 78 is electrically connected to a suitable control means for controlling the operation of an air cylinder 86. The lower end of air cylinder 86 is pivotally connected to a support 88 and has its upper end pivotally secured to a crank or arm 90 by pin 92. Collar 94 is secured to the upper end of post 95 by bolts or the like. Shaft 96 is rotatably mounted in collar 94 and has its lower end secured to the crank 90 by set screws 98 or the like. Plate 100 is secured to the upper end of shaft 96 by welding or the like. The guide pan means 38 is secured to plate 100 by means of the bolts 102 and 104 as illustrated in FIG. 5.

For purposes of description, guide pan means 38 will be described as having a top 106, sides 108 and 110 and bottom 112. Guide pan means 38 is provided with an upwardly extending plate portion 114 which has the bolts 102 and 104 secured thereto by welding or the like. Guide pan means 38 has an open upper end and an open lower end. As seen in FIG. 6, side walls 108 and 110 terminate in wing portions 116 and 118 which extend outwardly therefrom. It can also be seen in FIG. 6 that top 106 has a length shorter than the bottom 112.

In operation, the drive means or power means for operating the conveyor 28 will be actuated when the encasing machine 12 is actuated so that the hooks 36 will be moved adjacent the lower end of the guide pan means 38 as illustrated in the drawings. Actuation of the conveyor means causes the shaft 40 to be rotated which causes the cam wheel 56 to be rotated therewith. The rotation of the cam wheel 56 causes the lobes 70 and 72 to alternately engage and actuate the switch 78. The air cylinder 86 is inactive until the roller 84 of switch 78 is engaged by one of the lobes 70 and 72 during the rotation of the cam wheel 56. Engagement of the lobe 70 with the roller 84 causes air cylinder 86 to be actuated so that the rod thereof will be extended therefrom which causes the guide pan means 38 to be pivotally moved towards the position illustrated in FIG. 1. The guide pan means 38 is moved to the left as viewed in FIG. 1 until the lobe 70 disengages from the roller 84 which causes the deactivation of the air cylinder. The guide pan means 38 remains in the position of FIG. 1 until such time as the lobe 72 engages the roller 84 to actuate the switch 78. Actuation of the switch 78 by the lobe 72 causes the rod of the air cylinder 86 to be withdrawn thereinto to cause the guide pan means 38 to be pivotally moved from the position of FIG. 1 to the position of FIG. 2. The guide pan means 38 is continued to be pivoted to the position illustrated in FIG. 2 until such time as the lobe 72 disengages from the roller 84. The arcuate slots 74 and 76 permit the lobes 70 and 72 to be selectively adjusted with respect to the plate 62 to adjust the operation of the machine.

Thus, the alternate swinging movement of the guide pan means causes the linked product 120 to be alternately swung over the hooks 36 so that a predetermined number of links can be looped on either side of the hooks. In other words, the operation of the guide pan means 38 causes the linked product 120 to be looped over the hooks 36 so that the product will be conveyed away from the encasing machine in loops having a predetermined number of individual links on each side of the hooks 36. The guide pan 38 insures that the linked product will be properly hung over the spaced apart hooks and prevents damage to the same during the looping thereof.

The numeral 122 refers generally to a tray which at least partially receives the lower ends of the loops being moved by the conveyor means. The opposite ends of the loops are passed on opposite sides of a channel 124 having a smoke stick 126 positioned therein. The looped product is removed from the conveyor apparatus by simply manually grasping the smoke stick 126 and raising the same so that the loops are lifted from the hooks 36. The linked product is severed when the smoke stick 126 is loaded with the product then being carried to the smoke room or the like.

Figure 9:
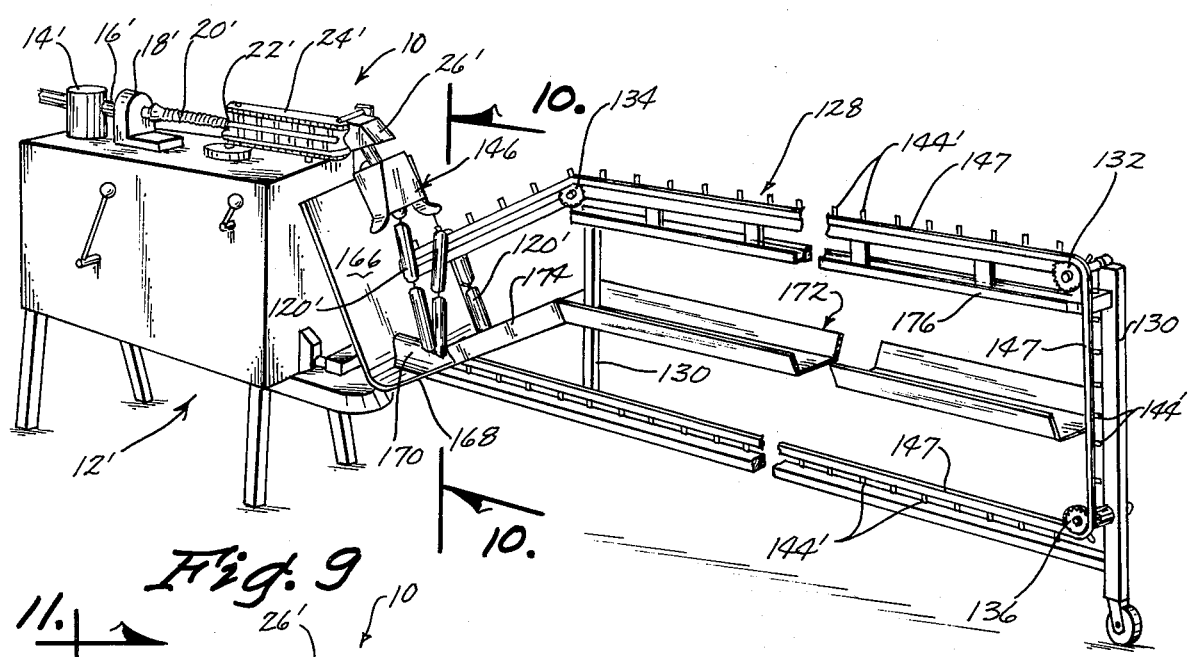
FIG. 9 is a perspective view of a modified form of the invention.
Figure 10:
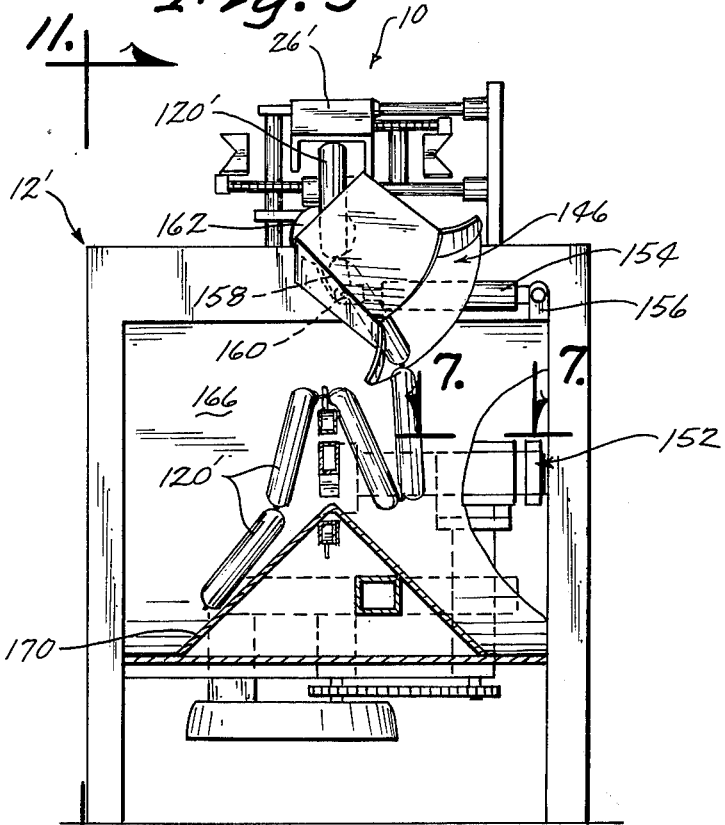
FIG. 10 is an enlarged sectional view seen along lines 10—10 of FIG. 9.
Figure 11:
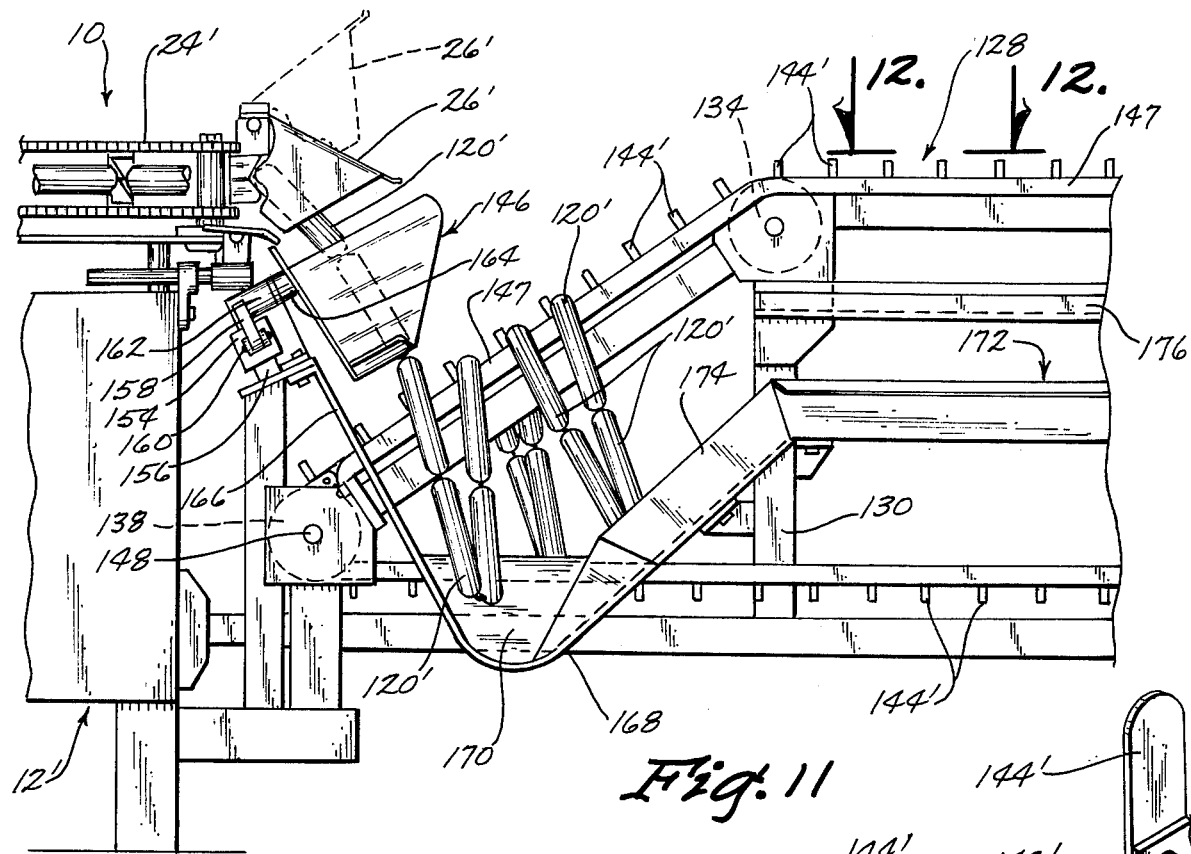
FIG. 11 is a sectional view seen on lines 11—11 of FIG. 10.
Figure 12:
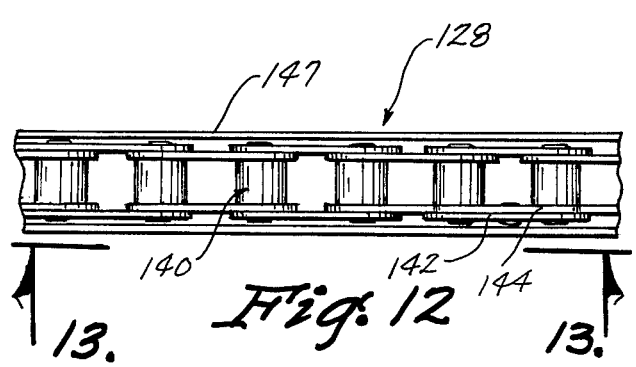
FIG. 12 is an enlarged view seen on lines 12—12 of FIG. 11.

Referring to FIGS. 9–15, the numeral 10' generally designates an apparatus subtantially similar to apparatus 10 so as to produce sausages, franks and the like. Apparatus 10' is also fully disclosed in U.S. Pat. No. 3,694,853 and generally includes a casing filling machine 12' having a conventional drive system enclosed therein. Casing filling machine 12' includes a product pump 14' adapted to pump products of plastic consistency. A connecting conduit 16' connects pump 14' to a spindle housing 18' having an elongated stuffing tube 20' extending therefrom. The meat product is pumped into the casing 22' mounted on the stuffing tube 20' and passed through the linking apparatus generally designated by the reference numeral 24'. The linked product is delivered to a guide means 26' adapted to guide the linked product 120' downwardly from the linking apparatus. As seen in FIG. 11, the upper end of guide means 26' is pivotally connected to the apparatus 10' so that the guide means 26' can be raised from the position illustrated by solid lines of FIG. 11 to the position illustrated by broken lines in FIG. 11 to facilitate repair, replacement and/or cleaning of the apparatus.

Figure 13:
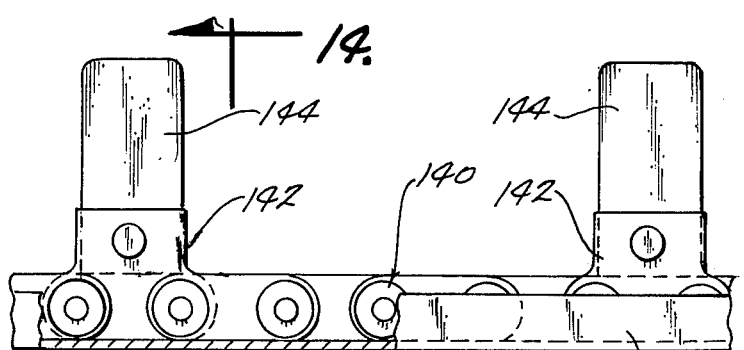
FIG. 13 is a sectional view of the conveyor chain as seen on lines 13—13 of FIG. 12.
Figure 14:
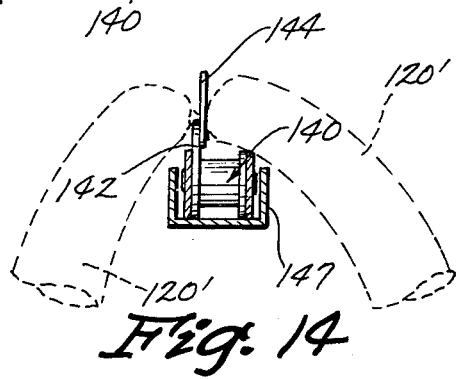
FIG. 14 is a sectional view seen on lines 14—14 of FIG. 13.

The apparatus 128 refers generally to a conveying device including a conveyor frame 130 which supports a pair of spaced apart sprockets 132 and 134 at its upper end. Conveyor frame 130 is also provided with a sprocket 136 positioned below sprocket 132 and a sprocket 138 positioned at the forward end thereof as seen in FIG. 11. Trained around sprockets 132, 134, 138 and 136 is a conveyor chain 140 having a plurality of spaced apart plate members 142 secured thereto which have upwardly extending portions 144 provided thereon. Conveyor chain 140 is adapted to be moved around the sprockets on the conveyor frame and is positioned so that the upstanding portions 144 pass adjacent the lower end of a guide pan means 146. As seen in FIG. 13, chain 140 is movably mounted in a U-shaped channel 147.

Sprocket 138 has a shaft 148 secured thereto which extends outwardly therefrom within a housing 150. Shaft 148 is operatively connected to a cam wheel mechanism referred to generally by the reference numeral 152 which is identical to the cam wheel apparatus 36 of FIGS. 1–8.

The base end of air cylinder 154 is pivotally connected to the support means 156 and has its rod end pivotally connected to a crank or arm 158 by pin or bolt 160. The upper end of crank 158 is operatively connected to a forwardly extending collar or support 162 which is suitably rotatably mounted on the upper end of the support 156. Collar 162 has a plate 164 at its forward end to which is bolted the guide pan or guide pan means 146. Guide pan means 146 is substantially identical to guide pan means 38 and will not be described in detail.

The numeral 166 refers to a shield means positioned below the guide pan means 146 through which passes the upper portion of the conveyor chain as illustrated in FIG. 9. Shield 166 is provided with an upwardly extending arcuate portion 168 at its lower end having an inverted V-shaped guide 170 provided therein as seen in FIGS. 9 and 10. The numeral 172 refers generally to a tray which at least partially receives the lower ends of the loops being moved by the conveyor means. As seen in FIG. 9, the forward end of tray 172 is provided with a downwardly extending portion 174 which passes on opposite sides of the upwardly extending shield portion 168. The opposite ends of the loops are passed on opposite sides of a channel 176 having a smoke stick positioned therein.

With respect to the apparatus of FIGS. 9-15, the normal method of operation is as follows. In operation, the drive means or power means for operating the conveyor 128 will be actuated when the encasing machine 12' is actuated so that the upwardly extending plate portions 144 will be moved upwardly through the shield 166 and beneath the guide pan means 146. Actuation of the conveyor means 128 causes the shaft 148 to be rotated which causes the cam wheel associated therewith to be rotated to cause the air cylinder 154 to be operated in the same manner as the air cylinder 96 in the apparatus of FIGS. 1-8. The guide pan means 146 is also moved back and forth in the direction indicated by the arrows in FIG. 9 in an identical fashion to the guide pan means 38.

Thus, the alternate swinging movement of the guide pan means causes the linked product 120' to be alternately swung over the roller chain 140 so that a predetermined number of links can be looped on either side of the chain. In other words, the operation of the guide pan means 146 causes the linked product 120' to be looped over the chain and engaged by the upstanding portions 144 so that the product will be conveyed away from the encasing machine in loops having a predetermined number of individual links on each side of the plates 142. The plates 142 handle the fragile encased product in a somewhat more gentle manner than the hooks and enables the attendant to more easily remove the looped product from the chain by means of the smoke stick at the proper time. The shield 166 and guide 170 serve to properly position the linked product 120 so that the lower ends of the loops will pass into the interior of the tray 172 without damage to the same. The looped product is removed from the conveyor apparatus by simply manually grasping the smoke stick as in the previous embodiment and raising the same so that the loops are lifted from the conveyor chain. The linked product is severed when the smoke stick is loaded and the product is then carried to the smoke room or the like.

Figure 15:
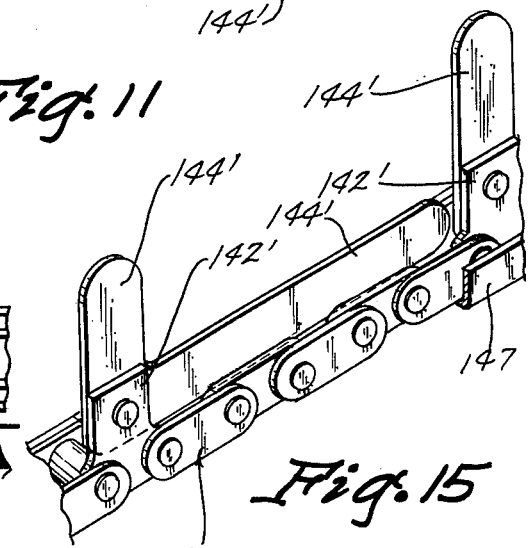
FIG. 15 is a perspective view of a modified form of the conveyor chain.

A modified form of the conveyor chain is seen in FIG. 15 and is generally designated by the reference number 140'. L-shaped fingers 144' are secured to the plates 142' and define horizontal and vertical portions for supporting and engaging the casing respectively.

Thus, it can be seen that the looping and conveying apparatus accomplishes at least all of its stated objectives.

I claim:

1. Looping and conveying apparatus for use with means adapted to issue forth an elongated linked casing, said apparatus comprising;
   a support,
   a guide means pivotally movably mounted on said support adapted to move between first and second positions, said guide means having first and second ends and a central area extending therebetween for receiving and supporting said casing, said first end adapted to receive said casing,
   a conveyor comprising a plurality of spaced apart casing supports thereon and also comprising carrying means for moving said casing supports along a predetermined path, said conveyor being positioned so that said casing supports will pass adjacent said second end of said guide means when being moved by said carrying means,
   power means for moving said guide means between its first and second positions to cause said casing supports to catch said casing at spaced points along the length of said casing,
   and selectively adjustable control means operatively connecting said carrying means and said power means to coordinate the movement of said guide means and said carrying means, so that said casing supports will catch and carry away said casing at predetermined spaced points along the length of said casing as said casing passes out of said second end of said guide means,
   said guide means being a pan means comprising a bottom having side walls extending upwardly therefrom, said bottom being disposed in an inclined plane so that its second end is disposed below its first end,
   a stub shaft operatively secured to said bottom of said pan means, said stub shaft being rotatably mounted on said support, an arm secured to said stub shaft and extending therefrom, said power means comprising an air cylinder operatively connected to said arm to pivotally move said pan means.

2. Looping and conveying apparatus for use with means adapted to issue forth an elongated linked casing, said apparatus comprising;
   a support,
   a guide means pivotally movably mounted on said support adapted to move between first and second positions, said guide means having first and second ends and a central area extending therebetween for receiving and supporting said casing, said first end adapted to receive said casing,
   a conveyor comprising a plurality of spaced apart casing supports thereon and also comprising carrying means for moving said casing supports along a predetermined path, said conveyor being positioned so that said casing supports will pass adjacent said second end of said guide means when being moved by said carrying means,
   power means for moving said guide means between its said first and second positions to cause said casing supports to catch said casing at spaced points along the length of said casing,
   and selectively adjustable control means operatively connecting said carrying means and said power means to coordinate the movement of said guide means and said carrying means, so that said casing supports will catch and carry away said casing at perdetermined spaced points along the length of said casing as said casing passes out of said second end of said guide means, said carrying means comprising a flexible means trained around at least a pair of spaced apart sprockets, a shaft secured to one of said sprockets for rotation therewith, a cam means operatively secured to said shaft, a control means engageable with said cam means, said control means being connected to said power means for controlling the operation thereof responsive to the operation of said carrying means, said cam means comprising a hub secured to said shaft for rotation therewith, a cam member secured to said hub and having at least a pair of spaced apart lobes provided thereon, said control means including a switch means operatively connected to said power means and having an actuator arm extending therefrom, a roller on said actuator arm adapted to be engaged by said lobes as said cam member is rotated.

3. The apparatus of claim 2 wherein said cam member is adjustably secured to said hub means to permit the position of said lobes to be varied with respect to said switch means.

* * * * *